INVENTOR.
ROGER D. KELLER
ROBERT B. KOCH

Feb. 2, 1965 R. B. KOCH ETAL 3,167,961
CONDITION RESPONSIVE DEVICES
Filed Dec. 15, 1961 2 Sheets-Sheet 2

INVENTORS
ROGER D. KELLER,
ROBERT B. KOCH
BY
ATTORNEY

United States Patent Office 3,167,961
Patented Feb. 2, 1965

3,167,961
CONDITION RESPONSIVE DEVICES
Robert B. Koch, Hopkins, and Roger P. Keller, Bloomington, Minn., assignors to Honeywell Inc., a corporation of Delaware
Filed Dec. 15, 1961, Ser. No. 159,669
7 Claims. (Cl. 73—356)

The present invention is directed to improvements in time-temperature integrators. More specifically, the present invention provides a means for extending the useful temperature range of time-temperature integrators as disclosed in the co-pending applications of Bernt M. Tessem, Serial No. 754,573, filed August 12, 1958, entitled "Condition Responsive Device" and James J. Renier, Serial No. 137,322, filed September 11, 1961, entitled "Condition Responsive Device," now Patent 3,046,786, both of these applications being assigned to the same assignee as the present invention.

The present invention can best be understood in relation to the inventions as disclosed in each of the above identified applications. The present invention provides an improvement over that disclosed in each of the above identified patent applications in that it extends the useful temperature indicating ranges of these devices to temperatures well above 32° F.

Therefore, it is an object of the present invention to provide improved devices of the types disclosed in the above identified co-pending applications.

It is a further object of the present invention to provide an electrolyte useful in the above identified devices which contains only that amount of water needed to produce ionization.

Figure 1:
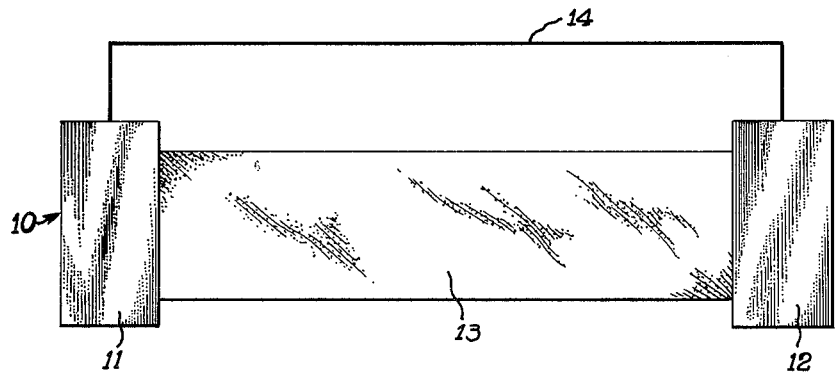

More particularly, it is the object of the present invention to extend the useful temperature range of the devices of the above identified applications to temperatures above that of the freezing point of water;

Other and further objects will become apparent from the following specification and drawing wherein:

FIGURE 1 illustrates schematically the device as disclosed in the co-pending Tessem application.

Figure 2:
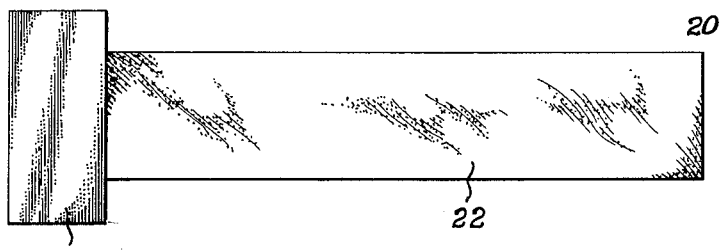

FIGURE 2 discloses the device in accordance with the co-pending Reiner application.

Figure 3A:
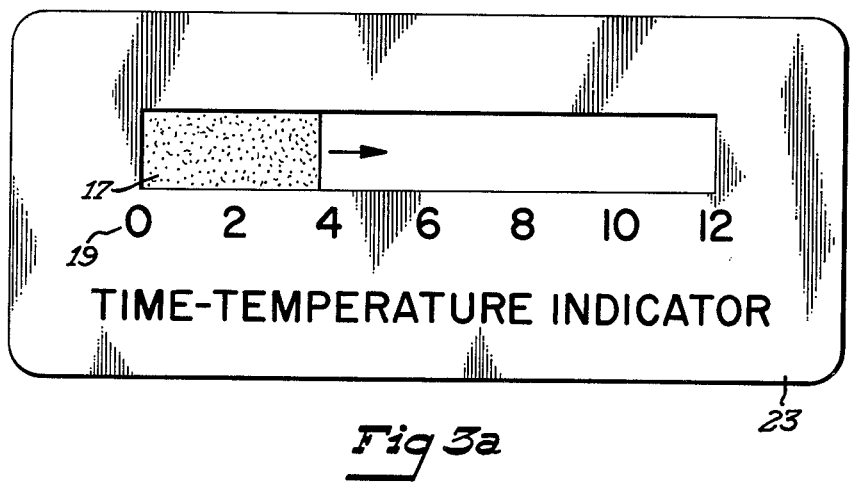
Figure 3B:
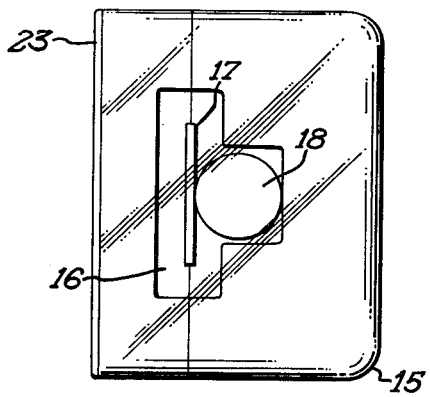

FIGURES 3a and 3b are front and sectional views of a packaged indicator of the present invention.

The device generally designated 10 disclosed in the co-pending Tessem application, and schematically illustrated in FIGURE 1, consists of two metal members designated 11 and 12, these metals being of dissimilar type; for example, copper and cadmium. These metal members are connected by an external electrical connection such as a wire 14. Completing a circuit between the metal members 11 and 12 is a porous matrix member 13 containing a quantity of an electrolyte. The electrolytes disclosed in the Tessem application consist primarily of water with small quantities of salts such as potassium chloride and also include a quantity of an indicator such as a pH sensitive indicator. The device is thus a galvanic cell. In operation, once the electrolyte has come in contact with the metal members 11 and 12, reaction products are produced; these reaction products then tending to migrate by diffusion and under the influence of the electrical field from the metal-electrolyte interface across the porous member 13. When a pH sensitive substance is used, the hydroxyl ions which are generated at the less noble member (in this instance copper) migrate across the porous member 13 and interact with the pH sensitive indicator to provide a color change. The extent of migration (indicated by a color change) is a measure of the time which has elapsed since the activation of the device by contact of the metal members with the electrolyte. In the Tessem device, the rate of generation of the ions and the rate of migration of the ions so generated are both time and temperature dependent.

The Renier application referred to hereinabove operates on a similar, but quite distinct, principle. Referring to FIGURE 2, 20 generally designates a device in accordance with the Renier teachings. 21 indicates a metal member selected from the group above hydrogen in the Electromotive Series. 22 generally designates a porous substance impregnated by the electrolyte solution which may be the same as that disclosed in the co-pending Tessem application. The electrolyte in this case also may contain an indicator substance. This device operates somewhat differently from that of the co-pending Tessem application. In the Renier application, the electrolyte substance reacts with the metal member 21 in accordance with the following general equation:

$$M° + 2H_2O \xrightarrow{salt} M^{++} + 2OH^- + H_2$$

As can be seen, the metal member is reacted with the water of the electrolyte to replace a hydrogen and is itself converted to its equivalent metal ion. This results in the formation of both metal ions and hydroxyl ions. The hydroxyl ions or metal ions then migrate by diffusion through the porous substance 22 and can be detected by use of suitable indicators. In this case, as in the Tessem application, the rate of movement of the reaction products is proportional to time and to temperature. In the Renier application the electrolyte is primarily water with small quantities of salts added thereto.

As a general rule, it has been found highly desirable to operate devices of both the Tessem and the Reiner applications while in the solid state. That is, while the rate of reaction and the rate of diffusion of the reacted ions is time and temperature dependent when the electrolyte is in a liquid state, it is generally desirable that the reaction and the rate of migration of the ions occur when the electrolyte substance is solid, i.e. below the freezing point. When the device of either of the above applications is operated in the liquid state, other effects enter into the over-all indication such as convection currents and liquid diffusion problems. While these can be taken into account, it is generally desirable that the device operate while in a solid condition. Further, in order to achieve a compact device it is necessary that the length of the diffusion media be relatively short. The much greater velocity of diffusion in the liquid state limits the total time capabilities of the indicator for a given length of diffusion media.

This poses no particular problems when the temperatures and times to be indicated are those at or below the freezing point of water. For example, one specific use of the device of either of the above applications is in the area of indication of quality of frozen food products. It has been found that the rate of reaction coupled with the rate of migration of the indicating ion very closely approximates the rate of deterioration of a frozen food when in the frozen state. It is generally known that a frozen food will still deteriorate even at temperatures as low as 0° F. at a finite rate. For example, many substances, even when stored at 0° F., show a marked quality deterioration over a span of a one-year period.

However, many areas of need exist for an indicator which will provide a time and temperature integrated indication for systems above the freezing point of water. For example, in the storage of various food products, human blood, and the like, it is undesirable that these materials be frozen; nor is it desirable that these materials be stored at temperatures exceeding a certain maximum for more than a specified period of time. Thus, a definite need exists for an integrator for this range of temperatures from the freezing point of water on up to considerably higher figures. A device as disclosed in the co-pending applications does not teach a suitable electrolyte for this purpose. As has been previously indicated, the desired operation of these devices is when the electrolyte is in a solid condition. When the electrolyte is in a liquid condition, the rate of reaction and migration of these products is excessively rapid for providing indication over long periods of time. The present invention provides electrolyte systems for use in these devices which will provide operability at considerably elevated temperatures over that of the freezing point of water.

We have found that electrolyte systems composed primarily or entirely of salts may be used in devices of the above types; these devices being operable in the solid state at temperatures well above the melting point of water. The electrolytes of the present invention are illustrated in a following example:

*Example I*

A eutectic mixture of silver nitrate, lithium nitrate, and ammonium nitrate was prepared by weighing out appropriate quantities of the various salts and heating the combination to a liquid condition. The final mixture had a melting point of 52° C., the eutectic point. This mixture was then maintained at a temperature of 105° C. (53° C. over the melting point) and a strip of chromatographic paper was immersed in the molten mixture. The mixture was maintained at a temperature over the melting point as a means of controlling the mass of salt which clung to and impregnated the chromatographic paper. Unless the temperature is maintained somewhat in excess of the melting point, the cooling effect of the paper produces an excessively bulky portion of salt mixture. The paper was withdrawn from the melt and allowed to cool to present a solid, salt impregnated strip. Several such salt strips were produced in the same manner.

One salt impregnated strip prepared in the above manner was utilized in a device per the co-pending Tessem application noted above. The metal strips 11 and 12 were applied to the ends of the strip by folding and crimping thin strips of metal about the ends of the salt impregnated paper. An external lead corresponding to 14 was connected to the ends of the tab of the two metals 11 and 12 to form the exterior connection of the assembly. The entire assembly was allowed to stand at room temperature and room relative humidity (approximately 50% RH) for a short period of time (less than ten minutes sufficed) until moisture equivalent to less than one percent by weight had been absorbed by the salt mixture. The quantity of absorbed moisture necessary has been found to be only that amount necessary to provide ionization. At this stage of moisture absorption, galvanic action is initiated due to the formation of ions in the electrolyte and the ions generated at the metal-electrolyte interface begin migrating across the strip. The entire assembly was then hermetically sealed within a transparent plastic envelope to prevent further moisture absorption or moisture loss. The absorption of moisture by the salt eutectic has a slight effect on the over-all melting point of this mixture. That is, the actual melting point is depressed somewhat from the anhydrous salt mixture. The galvanic action generated by completion of the circuit resulted in reducing some of the silver metal ions present in the salt electrolyte at the metal-salt interface to silver metal. The silver metal so generated was gray to black in color. The silver metal so reduced migrated across the porous strip 13 at a rate which was proportional both to time and to the temperature of the system, thus providing a visual indicaton of time-temperature experience.

A second strip of salt impregnated paper was utilized in the construction of a device in accordance with the co-pending Renier application noted above. A strip of magnesium metal was affixed to one end of the strip in a manner similar to that described above in relation to the Renier device. This assembly was also allowed to stand at room temperature in room relative humidity for a period sufficient to absorb a like small quantity of water. After the absorption of the small quantity of water the device was encapsulated within a transparent plastic envelope and allowed to stand at various temperatures. A reaction occurred in accordance with that generally indicated in a previous discussion of the Renier device. That is, the metal of member 21 reacted with the silver ion present in the electrolyte contained within member 22 to produce metal ions and silver metal. Black silver metal then migrated across the strip at a rate which was found to be proportional to both time and to the temperature of the device.

In using an electrolyte of the type described in this example, it has been found unnecessary to utilize any indicator materials within the electrolyte to combine with the reaction products of the electrolyte and metal members. However, an indicator substance has been utilized and found to increase the effective contrast in color produced between the reaction area and the unreacted area of the absorbent area. One such example of an indicator is pyrocatechol violet. The use of this indicator enhanced the color contrast. In order to perfom satisfactorily, it has been found that it is highly desirable to shield the above device from direct contact with certain wave lengths of light to prevent reduction of the silver ion by light effects. In this regard it has been found that a filter which effectively filters the blue light provides satisfactory protection.

FIGURES 3a and 3b illustrate one packaged device in accordance with the present invention. It should be understood that other modifications may be used in assembling the present invention into operative devices. The form shown in FIGURES 3a and 3b is merely illustrative.

The device of FIGURE 3 includes a heat sealable, transparent plastic case 15 defining a cavity 16 containing a wick-like substance 17 which may be, for example, chromatographic paper. Also contained within cavity 16 and in physical contact with the wick 17 is a glass vial 18 containing the electrolyte substance. An opaque strip of paper or the like 23 having a section removed to expose visually the wick 17 is adhered to the plastic envelope 15. A scale 19 may be printed on the paper to provide a reference. Not shown are the metal members 11 and 12 of the device of FIGURE 1, or alternatively, the metal member 21 of FIGURE 2.

Until the electrolyte is in contact with the metal members, no reaction can occur. To activate the device of FIGURES 3a and 3b the assembly is heated to a temperature sufficient to liquefy the electrolyte contained in the glass vial 18. The entire assembly is mechanically flexed to fracture the vial 18 and the electrolyte is adsorbed into the wick and comes into contact with the metal members thus activating the device. The device is then ready to be placed into the environment it is to provide time-temperature integration of. In the device shown in FIGURE 3a a portion of the wick 17 has been changed in color by the migration of ions in the direction indicated by the arrow.

*Example II*

In this system an electrolyte consisting entirely of lithium nitrate hydrate was used. This composition has a liquefaction point of approximately 29.8° C. A small quantity of water was added to the salt and the mixture heated to above 100° C. The quantity of water added may be varied over wide limits dependent on the particular need. In one specific example, 5% by weight of water was added. A small quantity of water is lost by evaporation in this operation; however, this is readily accounted for in the amount of water added. A strip of paper was impregnated in a manner similar to that described above and assembled into devices as previously described. The devices were allowed to absorb water in amounts above and beyond that necessary to return the lithium nitrate to a normal hydrate condition. The systems described above reacted in similar fashion as in Example I with the exception of the type of ions generated. It was necessary in the use of lithium nitrate as the electrolyte to incorporate a quantity of a pH indicating substance into the salt melt. For this purpose, the indicator Brilliant Yellow was found satisfactory.

In the device of the co-pending Tessem application, it was found that the hydroxyl ions generated at the copper electrode migrated through the lithium nitrate mixture at a rate proportional to time and temperature. The same was true in the Renier device. As in Example I, the melting point of the lithium nitrate electrolyte is dependent to some extent on the quantity of water which is absorbed into the system. The more water that is absorbed the lower the melting point tends to be.

*Example III*

Organic salts have also proved to be useful in the systems as disclosed in the co-pending Tessem and Renier applications. As an example of this type of system, sodium citrate may be used. A liquid consisting of 12 grams of sodium citrate combined with 10 grams of water at a temperature of 110° C. was produced and a strip of paper immersed in this mixture and impregnated as in Examples I and II. An indicator substance was incorporated into the melt as in Example II to provide a pH indicator. The indicator utilized was again Brilliant Yellow. A large number of indicators can be used, but our experience has been that Brilliant Yellow is particularly useful. The reactions occurring in the devices of the Tessem and Renier applications were essentially the same as that previously discussed with regard to Example II. That is, the hydroxyl ion resulting from the operation of these devices was utilized as the indicating ion to convert the pH indicator to a different color to visually indicate the extent of migration of the indicating ion. The extent of migration was found to be both time and temperature dependent.

In addition to the use of a pH sensitive indicator, it has been found that an indicator sensitive to the presence of a metal ion generated through the reaction of the metal member with the electrolyte may be used to indicate the extent of the migration of said metal ion. For example, when aluminum is used as the metal member the aluminum ion generated in the device of the Renier application may be detected through the use of pyrocatechol violet rather than using a pH substance to detect the generation of the hydroxyl ion.

It has also been found advantageous in the devices of both the Tessem and Renier co-pending applications to utilize a complexing agent in conjunction with the electrolyte. For example, ethylene diamine tetraacetic acid may be utilized. A very small quantity of this complexing agent (on the order of 0.1% by weight of the electrolyte) suffices to provide a more pronounced indication of the extent of migration of the various ions being utilized to indicate time and temperature of exposure.

*Example IV*

A solution of potassium nitrate in water was prepared at approximately 200° F. This solution was essentially saturated with potassium nitrate so as to provide a mixture which was approximately 50% by weight water and 50% by weight potassium nitrate. A strip of paper was immersed in this solution as in Examples I through III above and withdrawn. A very rapid cooling of the saturated strip resulted in an actual entrapment of the water within the crystal structure so as to provide a water-salt solid. Again, the various indicators indicated previously or their equivalents were inserted into the melt prior to impregnation of the paper. In all of the examples, the indicator substance can also be impregnated into the paper prior to its impregnation with the salt mixture.

Devices prepared using this electrolyte substance reacted as indicated in the foregoing examples.

*Example V*

A mixture of approximately 75% urea and 25% water containing a small quantity of sodium chloride (less than 1%) was heated to approximately 90° C. While sodium chloride was used in this specific example, any strong electrolyte may be substituted for the sodium chloride. At this temperature the entire system was in a liquid phase. A strip of chromatographic paper was impregnated as previously indicated with a pH indicator (Brilliant Yellow) and was then immersed into the electrolyte solution of urea and water. The strip was withdrawn and allowed to cool to room temperature. The resulting solid material consisted of urea crystals with occluded or entrapped salt solution interspersed throughout. The strip was placed into the electrode system of the Tessem application and galvanic action resulted at the electrodes. The reaction at the electrodes produced a boundary movement of hydroxyl ions migrating across the paper-salt mixture, this movement being at a rate proportional to both time and temperature.

*Example VI*

As a further variation of the general type of systems of Example V we have found that an electrolyte substance comprising a mixture of phenol, salt, and water provides the improvement of the present invention. A more specific illustration of such a system is:

$H_2O$ _____ 6 ml.⎫ 59° F. liquefaction point.
Phenol _____ 60 ml.⎭
$KCl$ _____ 10% by weight in water containing a quantity of Brilliant Yellow indicator.

A piece of chromatographic paper was dipped into the KCl in water solution, withdrawn and allowed to dry. This paper was then immersed in the liquid mixture of 60 ml. phenol and 6 ml. water, withdrawn and cooled to allow the phenol-water mixture to solidify. The resulting combination had a liquefaction point of 59° F. The quantity of salt may be varied dependent on need. In this example, the quantity was approximately equal to 10% by weight of the phenol-water mixture. The impregnated paper when utilized with either of the devices of the Renier application or of the Tessem application as previously discussed showed a rate of movement of the color boundary which was both time and temperature dependent.

It should be appreciated that a large number of systems of the same general type can be used with similar results. For example, other compositions of phenol and water than that specified above may be used. Likewise, other organic componds such as sugars and starches may be used in place of the phenol and still be within the scope of the general principle shown in the examples of V and VI above. The only restriction is that the system include an electroylte substance and sufficient water to produce ionization. Of course, the liquefaction point must also be above the melting point of water in order to provide the desired time-temperature integration of the present invention.

*Example VII*

In this instance a mixture of potassium nitrate and sodium nitrate of equal amounts by weight were mixed with an equivalent quantity of water so as to form a solution which was equivalent to 25% by weight of both potassium nitrate and sodium nitrate and 50% by weight of water. This solution was formed by heating the above composition to 100° C. to uniformly mix the components and then cooling rapidly to room temperature to produce a solid in accord with Example IV. In other respects the use of this solution in the time-temperature indicators of the previous examples produced a like effect.

That is, temperature dependence was found as to the rate of movement of the boundary indicator change.

In regard to this latter example, it should be understood that it is only one example of the large variety of mixed salts which are available for use in the indicator systems previously described. The quantity of water can be varied considerably with quantities as low as 5% by weight being sufficient to provide a workable indicator. The salt can be any number of mixed systems including both the binary and trinary types.

It should be appreciated that the operability of the electroyltes of the present invention are not limited to temepratures above 32° F. These electroyltes also provide time-temperature integrated history below 32° F., but naturally at a rate which is reduced the lower the temperature becomes. They are particularly advantageous at elevated temperatures.

The above examples should be considered as illustrative of various types which may be utilized. It will be apparent to those skilled in the art that a great variety of electrolyte systems of the types heretofore described may be used. It is apparent that all that is required to operate the devices of the above described co-pending applications is the existence of the electrolyte material that is ionized by the presence of relatively small quantities of water.

We claim:

1. In a time-temperature integrator device wherein an indication of the time-temperature experience of a system is visually indicated by the migration and detection of a reaction product generated at a metal-electrolyte interface, the indication being provided by the migration of said reaction product along a matrix medium containing said electrolyte, the improvement which comprises utilizing in said device and electrolyte substance consisting essentially of salt and a quantity of water sufficient to produce ionization, said electrolyte substance further characterized in having a liquefaction point above the melting point of water.

2. Apparatus for indicating the extent of exposure of a system to a temperature exceeding a certain minimum comprising a porous matrix medium having in contact therewith near one end thereof a metal body selected from the group above hydrogen in the Electromotive Series, said porous matrix medium being impregnated with a certain electrolyte substance, the ionic portion of said electrolyte substance being capable of undergoing a reaction at the metal-electrolyte substance interface to form a reaction product, said reaction product migrating along said matrix medium at a rate proportional to time and to temperature, means for visually detecting the extent of migration of said reaction product, said electrolyte substance being characterized in that it consists essentially of a salt and a quantity of water sufficient to produce ionization, said substance being further characterized in having a liquefaction point above the melting point of water.

3. Apparatus in accordance with claim 2 wherein said electrolyte substance consists essentially of a eutectic mixture of lithium nitrate-silver nitrate-ammonium nitrate containing a quantity of water sufficient to produce ionization said mixture characterized in having a liquefaction point above the melting point of water.

4. Apparatus in accordance with claim 2 wherein the electrolyte substance consists essentially of a mixture of urea, water and salt in proportions of 75% by weight urea, 25% by weight of water, and about 1% by weight of the urea and water of sodium chloride added thereto.

5. Apparatus in accordance with claim 2 wherein the electrolyte substance consists essentially of lithium nitrate containing sufficient water to produce ionization.

6. Apparatus in accordance with claim 2 wherein the electroylte substance consists essentially of a mixture of phenol, water and salt.

7. Apparatus in accordance with claim 2 wherein the electrolyte substance consists essentially of a mixture of 60 parts by volume phenol to 6 parts by volume water having incorporated therein a quantity of salt.

References Cited in the file of this patent
UNITED STATES PATENTS
3,046,786  Tessem _____ July 31, 1962